(12) United States Patent
Gacka et al.

(10) Patent No.: US 9,499,347 B2
(45) Date of Patent: Nov. 22, 2016

(54) DRIVE CONNECTION WITH INTEGRATED CHAIN TENSIONING APPARATUS FOR FACE CONVEYORS

(71) Applicant: Caterpillar Global Mining Europe GmbH, Lünen (DE)

(72) Inventors: Adam Gacka, Witten (DE); Andreas Scheer, Werne (DE);
(Continued)

(73) Assignee: Caterpillar Global Mining Europe GmbH, Lünen (DE)

( * ) Notice: Subject to any disclaimer, the term of this patent is extended or adjusted under 35 U.S.C. 154(b) by 0 days.

(21) Appl. No.: 14/890,250

(22) PCT Filed: Apr. 24, 2014

(86) PCT No.: PCT/EP2014/001101
§ 371 (c)(1),
(2) Date: Nov. 10, 2015

(87) PCT Pub. No.: WO2014/183831
PCT Pub. Date: Nov. 20, 2014

(65) Prior Publication Data
US 2016/0083191 A1    Mar. 24, 2016

(30) Foreign Application Priority Data
May 13, 2013    (EP) .................................... 13167530

(51) Int. Cl.
*B65G 23/44*    (2006.01)
*E21C 29/14*    (2006.01)

(52) U.S. Cl.
CPC ............. *B65G 23/44* (2013.01); *E21C 29/145* (2013.01)

(58) Field of Classification Search
CPC .................................................... B65G 23/44
(Continued)

(56) References Cited

U.S. PATENT DOCUMENTS 3,134,479 A * 5/1964 Daily ................... B65G 23/44
198/507
3,855,871 A * 12/1974 Gibson ................. B65G 23/44
474/110
(Continued)

FOREIGN PATENT DOCUMENTS

CN    201089632 Y    7/2008
DE    849092    9/1952
(Continued)

OTHER PUBLICATIONS

International Search Report mailed Sep. 9, 2014, in Patent Application No. PCT/EP2014/001101 by the European Patent Office (3 pages).
European Search Report dated Oct. 7, 2013, in Patent Application No. EP 13 16 7530 (2 pages).

*Primary Examiner* — William R Harp

(57) ABSTRACT

A drive connection is disclosed. The drive connection may be configured to be interconnected between a main driving unit and a main gear unit of a driving device configured to drive a chain of a conveyor of a longwall device. The drive connection may have a housing configured to be connected to the main driving unit and to the main gear unit. The drive connection may also have a drive shaft disposed within the housing and configured to transmit torque from the main driving unit to the main gear unit. In addition, the drive connection may have a chain tensioning apparatus disposed within the housing. The chain tensioning apparatus may have a worm drive interacting with the drive shaft. The chain tensioning apparatus may be configured to drive the drive shaft for tensioning the chain of the conveyor when the main driving unit is in a non-operative state.

18 Claims, 3 Drawing Sheets

(72) Inventors: Dennis Grimm, Nordkirchen (DE);
Tobias Kleinbongartz, Dinslaken (DE);
Thomas Hoelken, Bergkarmen (DE);
Michael Nafe, Holzwickede (DE);
Peter Pientka, Datteln (DE); Svenja Bauhaus, Lünen (DE); Alexander Jänsch, Südkirchen (DE); Jessica Johnson, Lünen (DE)

(58) Field of Classification Search
USPC .................................. 198/813–816, 832–835
See application file for complete search history.

(56) References Cited

U.S. PATENT DOCUMENTS

| | | | | |
|---|---|---|---|---|
| 3,863,522 A | * | 2/1975 | Gibson | B65G 23/44 198/834 |
| 4,043,213 A | * | 8/1977 | Gibson | E21C 29/14 198/834 |
| 4,438,837 A | * | 3/1984 | Stoppani | F16H 1/203 198/735.3 |
| 5,171,065 A | | 12/1992 | Steinkuhl et al. | |

FOREIGN PATENT DOCUMENTS

| | | |
|---|---|---|
| DE | 3544734 A1 | 6/1987 |
| DE | 3905803 A1 | 8/1990 |
| GB | 1198024 A | 7/1970 |

\* cited by examiner

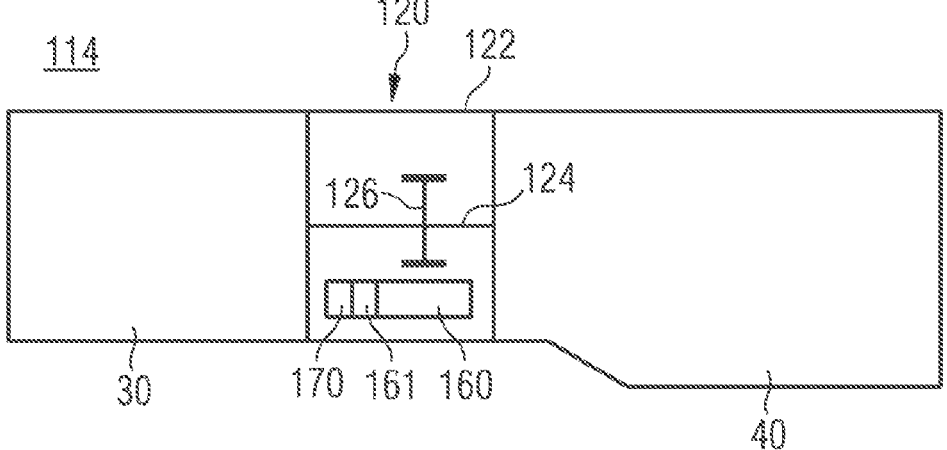
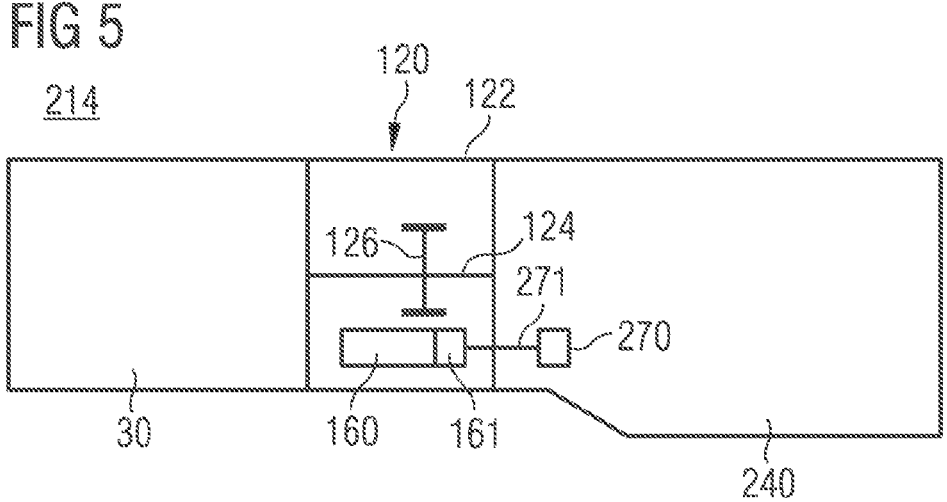
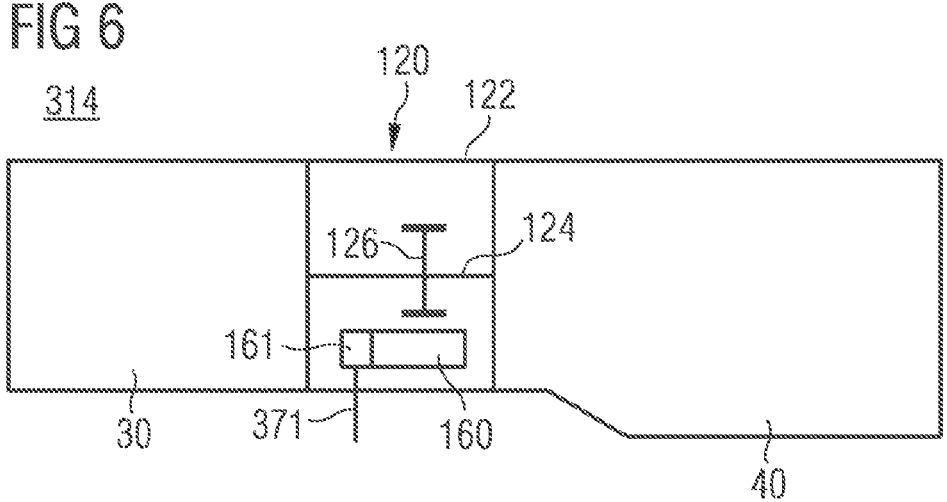

DRIVE CONNECTION WITH INTEGRATED CHAIN TENSIONING APPARATUS FOR FACE CONVEYORS

CLAIM FOR PRIORITY

This application is a U.S. National Phase entry under 35 U.S.C. §371 from PCT International Application No. PCT/EP2014/001101, filed Apr. 24, 2014, which claims benefit of priority of European Patent Application No. 13167530.8, filed May 13, 2013, all of which are incorporated herein by reference.

TECHNICAL FIELD

The present disclosure generally relates to a drive connection with an integrated chain tensioning apparatus to be used in underground mining applications and, more particularly, to a drive connection with an integrated chain tensioning apparatus having a worm gear.

BACKGROUND

In underground mining applications, conveying systems are used to transport, for example, extracted minerals such as coal or stone. Usually, a face conveyer is configured to be disposed under shield supports arranged within a longwall face. The face conveyer transports the coal extracted from the longwall face by a plow into a drift, where a gate conveyer is disposed for transporting the extracted minerals out of the underground mine. The face conveyer is equipped with a chain reciprocally running on an upper run and lower run, carrier elements connected to the chain for taking the minerals along the conveyor, a sprocket disposed at least at one end of the face conveyor for driving the chain, and at least one main driving device configured to drive the sprocket. The chain is configured to be wound around the sprocket.

Prior operation of the conveyor, the chain needs to be brought in place and tensioned, which means that both ends of the chain needs to be brought together for forming a closed chain running in the upper and lower runs of the conveyor. For achieving this, in prior art systems, a chain tensioning apparatus externally attached to the main driving device is configured to input torque to the sprocket for bringing the ends of the chain together, as the output torque of the main driving unit, which drives the chain during normal operation of the conveyor, may be inappropriate for performing the installation process of the chain.

During operation, the chain may be tensioned or loosened by axially displacing at least one of the sprockets disposed at each end of the conveyor. However, in cases that axial displacement of the at least one sprocket may not be sufficient to tension the chain, the above-mentioned chain tensioning apparatus may be used for tensioning the chain. Thus, the chain tensioning apparatus tensions the chain when either the chain may be installed in the face conveyor or when the axial displacement of the at least one sprocket may be not sufficient to tension the chain.

U.S. Pat. No. 5,171,065 A discloses a mineral mining installation with chain-tensioning systems, wherein a plow box containing a chain wheel driving a chain to propel a chain used to move a plow is mounted for displacement alongside a machine frame at one end of a scraper chain conveyer.

CN 201 089 632 Y discloses a worm-gear self-locking conveying-belt loosening and tightening machine.

GB 1 198 024 A relates to a tensioning system configured to axial displace a tensioning role over which the chain of the face conveyer runs. By axially displacing the tensioning role, the chain may be tensioned or loosened.

The present disclosure is directed, at least in part, to improving or overcoming one or more aspects of prior systems.

SUMMARY OF THE DISCLOSURE

According to an aspect of the present disclosure, a drive connection configured to be interconnected between a main driving unit and a main gear unit of a driving device configured to drive a chain of a conveyor of a longwall device may comprise a housing configured to be connected to the main driving unit and to the main gear unit, a drive shaft disposed within the housing and configured to transmit torque from the main driving unit to the main gear unit, and a chain tensioning apparatus disposed within the housing and including a worm drive interacting with the drive shaft. The chain tensioning apparatus may be configured to, when the main driving unit is in a non-operative state, drive the drive shaft for tensioning the chain of the conveyor.

According to another aspect of the present disclosure, a driving device for driving a sprocket engaging a chain of a conveyor of a longwall device may comprise a main driving unit configured to generate torque for driving the sprocket, a main gear unit connected to the sprocket and configured to receive the torque generated by the main driving unit and to transmit the torque to the sprocket for driving the same, and a drive connection according to the present disclosure. The drive connection being interconnected between the main driving unit and the main gear unit.

Other features and aspects of this disclosure will be apparent from the following description and the accompanying drawings.

BRIEF DESCRIPTION OF THE DRAWINGS

FIG. 4 illustrates an exemplary embodiment of a drive connection interconnected between a main driving unit and a main gear unit;

FIG. 5 illustrates another exemplary embodiment of a drive connection interconnected between a main driving unit and a main gear unit; and FIG. 6 illustrates another exemplary embodiment of a drive connection interconnected between a main driving unit and a main gear unit.

DETAILED DESCRIPTION

Figure 1:
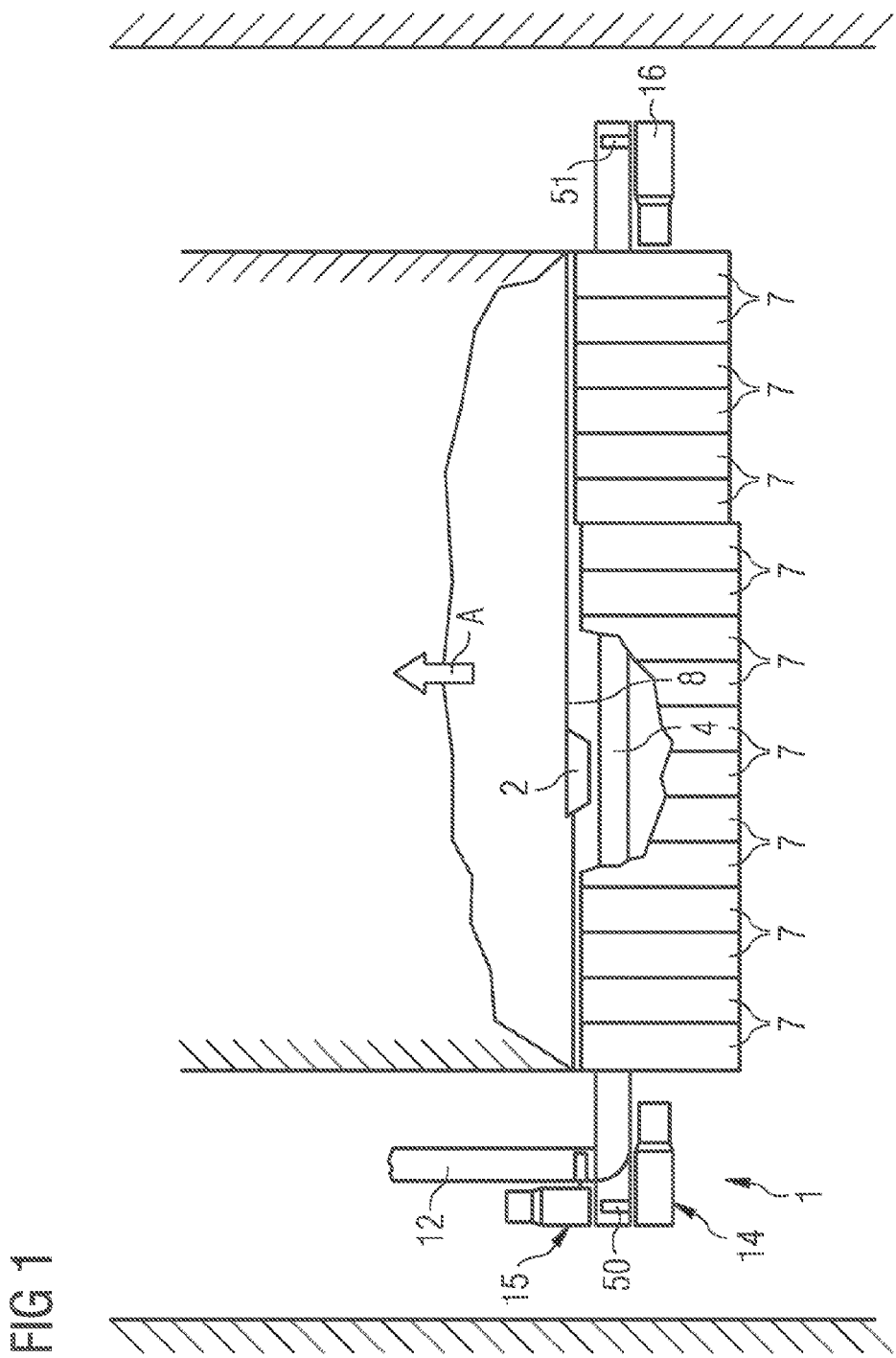
FIG. 1 illustrates an exemplary disclosed longwall device installed in a longwall face in underground mining applications.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure may be based in part on the realization that integrating a chain tensioning apparatus into a drive connection of a main driving unit for underground mining applications may lead to a compact arrangement of the drive connection and, thus, may facilitate mounting of the whole arrangement and may reduce the number of components. Further, unused installation space within the drive connection may be used, and no additionally protection device, such as, for example, a protection plate configured to protect an externally attached chain tensioning apparatus from flying material against damage is needed.

The present disclosure may be further based in part on the realization that providing a chain tensioning apparatus including a worm drive may lead to a self-locking device. Specifically, the worm drive may be a self-locking unit and, therefore, no additional brake system for braking the chain may be necessary, when an emergency event occurs during a chain tensioning process. This may further reduce manufacturing costs and can reduce the intervals of maintenance.

The present disclosure may be further based on the realization that providing a worm drive integrated within the drive connection may provide an adjustable transmission ratio of the worm drive. For example, by adjusting the thread pitch of the worm shaft, or by adjusting the module of the worm drive, a desired transmission ratio may be obtained.

The present disclosure may be further based in part on the realization that a hydraulic motor integrated into the drive connection may be driven by pressurized hydraulic medium, such as, HLP (mineral oil with additives to increase corrosion protection) oil which may increase the efficiency of the hydraulic motor and may reduce corrosion of the hydraulic motor, as HLP oil may contain less water than, for example, HFA (hydraulic fluid fireresistant) oil, which may be used in the common longwall oil system in the prior art and may include an amount of up to 80% water.

Referring now to the drawings, FIG. 1 is an exemplary illustration of a longwall device 1 installed in a longwall in an underground mine Specifically, the longwall device 1 includes at least one shield support 7, a face conveyor 4, a mining plow 2 configured to run back and forth along the face conveyor 4 for extracting minerals, such as, for example, coal out of a longwall 8, a main driving device 14 for driving a sprocket 50 engaging a chain 6 (see FIG. 2) of the face conveyor 4, an auxiliary driving unit 16 configured to drive a sprocket 51 oppositely disposed with respect to the sprocket 50, and a gate conveyor 12 configured to transport the extracted minerals out of the underground mine. The face conveyor 4 may be, for example, an armored face conveyor known in the art. The longwall device 1 is configured to advance in direction of the longwall 8, namely along a direction indicated by an arrow A.

As further illustrated in FIG. 1, the chain (not shown in the drawings) of the gate conveyor 12 is driven by a main driving unit 15 including a similar arrangement as the main driving device 14, which is described in greater detail below and with reference to FIGS. 2 to 6.

Figure 2:
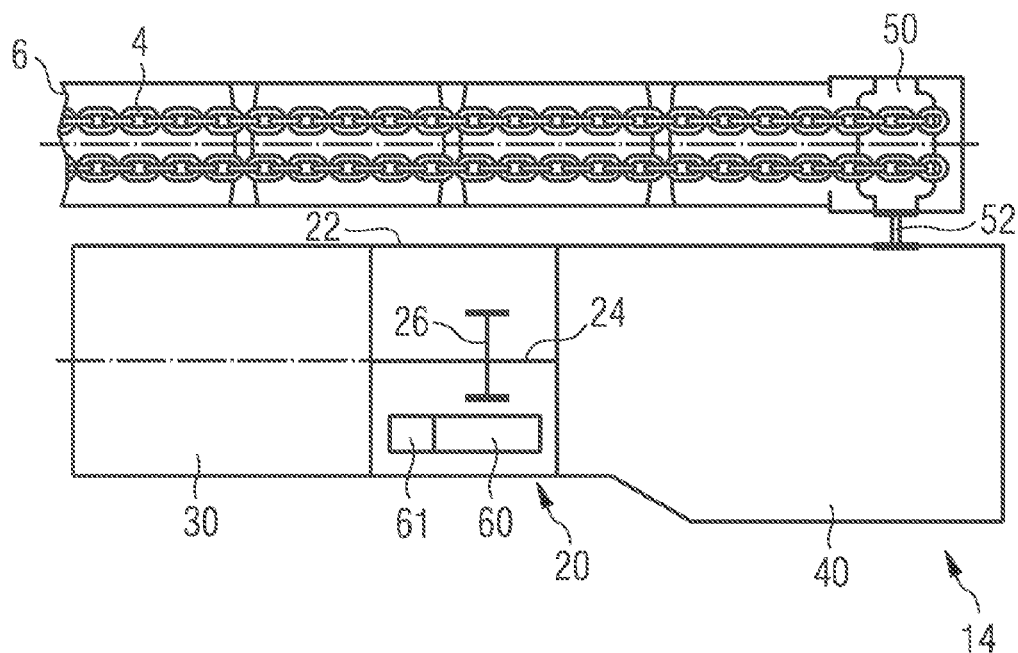
FIG. 2 illustrates a driving device for driving a sprocket engaging a chain of a face conveyer.

With reference to FIG. 2, the main driving device 14 including an exemplary disclosed drive connection 20 is shown in greater detail. It should be appreciated that the same drive connection 20 described in the following with respect to the main driving device 14 may also be used and employed in the auxiliary driving device 16. Further, the exemplary disclosed driving unit 20 may also be used and employed in the main driving unit 15 of the gate conveyor 12.

As schematically shown in FIG. 2, the driving device 14 comprises a main driving unit 30, a main gear unit 40, and a drive connection 20 interconnected between the main driving unit 30 and the main gear unit 40. The main gear unit 40 may include different kinds of gear units and gear stages for transmitting torque generated by the main driving unit 30 to the sprocket 50 engaging the chain 6 running along the longitudinal direction of the face conveyor 4. In some embodiments, the main gear unit 40 may include a planetary gear unit having a sun gear, a gear ring, and a predetermined number of planet gears. In some other embodiments, the main gear unit 40 may additionally or alternatively include a beveled gear set in combination with a planetary gear unit.

The main driving unit 30 may be a driving unit commonly used in underground mining applications. For example, the main driving unit 30 may be an electromotor configured to generate torque for driving the sprocket 50 and, thus, the chain 6. The power transmitted by the main gear unit 40 to the sprocket 50 may range from about 250 kW to about 3000 kW.

The drive connection 20 is interconnected between the main driving unit 30 and the main gear unit 40 and configured to transmit the torque generated by the main driving unit 30 to the main gear unit 40. As schematically illustrated in FIG. 2, the drive connection 20 comprises a housing 22, a drive shaft 24 configured to be connected to the main driving unit 30 and to the main gear unit 40, an integrated chain tensioning apparatus 60 interacting with the drive shaft 24, and an integrated hydraulic motor 61 configured to receive pressurized hydraulic medium for driving the chain tensioning apparatus 60. As further indicated in FIG. 2, the drive shaft 24 may include a drive shaft pinion 26 fixedly attached to the drive shaft 24 and configured to engage the chain tensioning apparatus 60, which is described in greater detail with respect to FIG. 3.

The main gear unit 40 is mechanically connected to the sprocket 50 via a shaft 52 for driving the sprocket 50 and, thereby, driving the chain 6 of the face conveyor 4. The connection of the shaft 52 to the main gear unit 40 and the sprocket 50 may be a commonly known mechanical connection.

Figure 3:
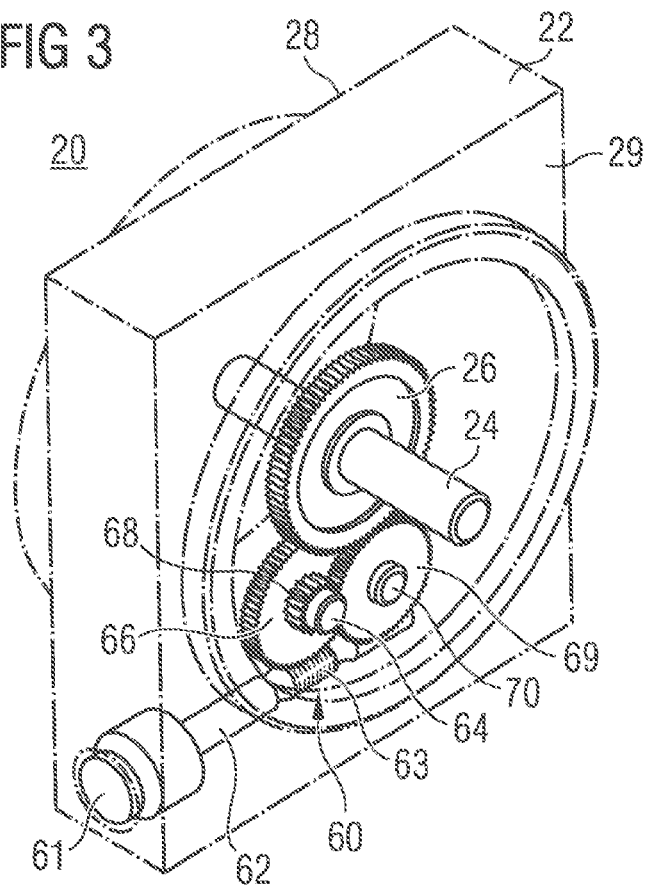
FIG. 3 illustrates an perspective view of an exemplary disclosed drive connection with an integrated chain tension apparatus including a worm drive.

Referring now to FIG. 3, the drive connection 20 is illustrated in greater detail. Specifically, the housing 22 includes a first face 28 configured attach to the main driving unit 30, and a second face 29 configured to attach to the main gear unit 40. The housing 22 is configured to not protrude into the work space of the mining plow 2. Thus, the first face 28 and the second face 29 are configured to match with the attachment faces of the main driving unit 30 and the main gear unit 40, respectively, and that the housing 22 between the first face 28 and the second face 29 has no protrusions.

The housing 22 may be attached to the main driving unit 30 and the main gear unit 40 by commonly known fixing devices, such as, screws, rivets, welds, or any other suitable fixing devices. The drive shaft 24 extends through the housing 22 and may be directly connected to the main driving unit 30 and the main gear unit 40. Specifically, the drive shaft 24 is configured to transmit torque generated by the main driving unit 30 to the main gear unit 40. The drive connection 20 further includes the chain tensioning apparatus 60 disposed within the housing 22 and configured to interact with the drive shaft 24. The drive shaft pinion 26 may include a predetermined number of teeth configured to engage another gear for transmitting rotational forces and torques.

The chain tensioning apparatus 60, as shown in FIG. 3, may include a hydraulic motor 61, a worm drive, and a control unit (not explicitly shown in the drawings) configured to control operation of the hydraulic motor and, thus, of the chain tensioning apparatus 60. The hydraulic motor 61 may be disposed within the housing 22, such that the hydraulic motor 61 may be accessible from the outside of the housing 22 for facilitating, for example, maintenance and replacement of the hydraulic motor 61 during malfunction.

The worm drive comprises a worm shaft 62 including a worm 63, and a worm wheel 66 fixedly attached to a first countershaft 64 and engaging the worm 63. The first countershaft further includes a countershaft pinion 68 fixedly attached to the first countershaft 64. Further, for transmitting the torque from the worm drive to the drive shaft pinion 26, a second countershaft 70 includes a countershaft pinion 69 attached to the second countershaft 70 and being axially displaceable along the second countershaft 70. Particularly, the countershaft pinion 69 may be axially displaced by a displacement device, for example, a lift rod (not shown in the drawings). When being in an engaged state, the countershaft pinion 69 engages the drive shaft pinion 26. When being in an disengaged state, the countershaft pinion 68 disengages the drive shaft pinion 26.

In some embodiments, the countershaft pinion 69 may be fixedly attached to the second countershaft 70. In such embodiments, the second countershaft 70 may be axially displaceably, such that the countershaft pinion 69 engages or disengages the drive shaft pinion 26.

The countershaft pinions 68, 69 and the drive shaft pinion 26 may be spur gears. In some embodiments, the worm 63 of the worm shaft 62 may directly engage the drive shaft pinion 26. In such case, the drive shaft pinion 26 constitutes the worm wheel of the worm drive.

Claw couplings provided at each end of the drive shaft 24 may be configured to compensate alignment errors between the main driving unit 30 and the main gear unit 40.

In some embodiments, the countershaft pinion 69 may be axially displaceable, such that the countershaft pinion 68 may engage or disengage the drive shaft pinion 26. During normal operation of the main driving unit 30, the drive shaft 24 is driven by the main driving unit 30 and the drive shaft pinion 26 may freely rotate without engaging the chain tensioning apparatus 60.

The worm shaft 62 is configured to be drivingly attached to the hydraulic motor 61, such that the hydraulic motor 61 drives the worm shaft 62. By adjusting, for example, the thread pitch of the worm 63 and, for instance, the diameters and number of teeth of the worm wheel 66, the countershaft pinions 68, 69, and the drive shaft pinion 26, respectively, a desired transmission ratio of the worm drive may be provided. For example, the desired transmission ratio of the worm drive may range from about 65 to about 100, where the transmission ratio between the worm 63 and the worm wheel 66 may range from about 10 to about 20, and the transmission ratio between the countershaft pinions 68, 69, and the drive shaft pinion 26 may range from about 2 to about 10.

The drive shaft 24 and the worm shaft 62 are arranged to each other such that the respective longitudinal axes may be perpendicular to each other. By providing the chain tensioning apparatus 60 with a worm drive integrated into the housing 22 as described above, a compact arrangement of the drive connection 20 may be achieved. Therefore, for example, no additional protective element for protecting an externally attached chain tensioning apparatus from any extracted minerals flying around in the working space may be needed.

Referring now to FIG. 4, an exemplary embodiment of a drive connection 120 used in a driving device 114 is shown. The drive connection 120 according to this embodiment is interconnected between the main driving unit 30 and the main gear unit 40. The drive connection 120 includes similar components as described with respect to FIGS. 2 and 3, namely a drive shaft 124, a drive shaft pinion 126 fixedly attached to the drive shaft 124, a chain tensioning apparatus 160 integrated within a housing 122, and a hydraulic motor 161 configured to drive the worm shaft (not explicitly shown in FIG. 4). It should be noted that the chain tensioning apparatus 160 including the worm drive may be identically configured as shown in FIGS. 2 and 3.

For driving the chain tensioning apparatus 160, particularly for driving the hydraulic motor 161, a hydraulic pump 170 may be further integrated within the housing 122. The hydraulic pump 170 may be a variable displacement hydraulic pump, such as, for instance, an axial piston pump, a radial piston pump, a gear wheel pump, or a rotary vane pump. As shown in FIG. 4, the hydraulic pump 170 is in direct communication with the hydraulic motor 161 for providing pressurized hydraulic medium to the hydraulic motor 161, such as, for instance, HLP oil. The hydraulic medium may originate from a hydraulic tank (not explicitly shown in the drawings) also integrated within the housing 122. In some embodiments, the hydraulic pump 170 may be configured to draw the HLP oil which is already included in the housing of the drive connection 120. In such embodiments, the housing 122 constitutes the hydraulic tank.

According to the embodiment of FIG. 4, the hydraulic pump 170 may provide HLP oil to the hydraulic motor 161, as the hydraulic tank may be safely disposed within the drive connection 120 and, thus, fire-resistant HFA oil may be not required. Operating the hydraulic motor 161 with HLP oil may increase the efficiency of the hydraulic motor 161 and may not corrode the hydraulic motor 161 as strong as when operating the hydraulic motor 161 with fire-resistant HFA oil containing up to 80% water, or may even prevent corrosion of the hydraulic motor 161.

According to this embodiment, by disposing the chain tensioning apparatus 160, the hydraulic motor 161, and the hydraulic pump 170 within the housing 122, a compact arrangement of the drive connection 120 can be achieved.

Referring now to FIG. 5, another exemplary embodiment of a drive connection 120 used in a driving device 214 is shown. The drive connection 120 according to this embodiment is also interconnected between the main driving unit 30 and a main gear unit 140 including a hydraulic pump 270. The drive connection 120 includes identical components as the drive connection 120 described with respect to FIG. 4, namely the drive shaft 124, the drive shaft pinion 126 fixedly attached to the drive shaft 124, the chain tensioning apparatus 160 integrated within the housing 122, and the hydraulic motor 161 configured to drive the worm shaft (not explicitly shown in FIG. 5). It should be noted that the chain tensioning apparatus 160 including the worm drive may also be identically configured as shown in FIGS. 2 and 3.

For driving the chain tensioning apparatus 160, particularly for driving the hydraulic motor 161, a hydraulic pump 270 may be disposed within the main gear unit 140. The hydraulic pump 270 may be a variable displacement hydraulic pump, such as, for instance, an axial piston pump, a radial piston pump, a gear wheel pump, or a rotary vane pump. As shown in FIG. 5, the hydraulic pump 270 is in direct communication with the hydraulic motor 161 via a hydraulic line 271 for providing pressurized hydraulic medium to the hydraulic motor 161, such as, for instance, HLP oil. The hydraulic medium may originate from a hydraulic tank (not explicitly shown in the drawings) also disposed within the main gear unit 140. In some embodiments, the hydraulic pump 270 may be configured to draw the HLP oil which is already included in the main gear unit 240 of the drive connection 120. In such embodiments, the main gear unit 240 constitutes the hydraulic tank.

According to the embodiment of FIG. 5, the hydraulic pump 270 may provide common HLP oil to the hydraulic motor 161 via the hydraulic line 271, as the hydraulic tank may be safely disposed within the main gear unit 140 and, thus, fire-resistant HFA oil may be not required. Operating the hydraulic motor 161 with HLP oil may increase the efficiency of the hydraulic motor 161 and may not corrode the hydraulic motor 161 as strong as when operating the hydraulic motor 161 with fire-resistant HFA oil, or may even prevent corrosion of the hydraulic motor 161.

According to this embodiment, by disposing the hydraulic pump 270 within the main gear unit 140, a compact arrangement of the drive connection 120 can be achieved, as more space is provided within the drive connection 120.

Referring now to FIG. 6, another exemplary embodiment of a drive connection 120 used in a driving device 314 is shown. The drive connection 120 according to this embodiment is also interconnected between the main driving unit 30 and the main gear unit 40, which may be similar or identical to the respective units of FIGS. 1 to 4. The drive connection 120 includes identical components as the drive connection 120 described with respect to FIG. 4, namely the drive shaft 124, the drive shaft pinion 126 fixedly attached to the drive shaft 124, the chain tensioning apparatus 160 integrated within the housing 122, and the hydraulic motor 161 configured to drive the worm shaft (not explicitly shown in FIG. 5). It should be noted that the chain tensioning apparatus 160 including the worm drive may also be identically configured as shown in FIGS. 2 and 3.

For driving the chain tensioning apparatus 160, particularly for driving the hydraulic motor 161, hydraulic line 371 may be configured to supply pressurized hydraulic medium from an oil supply system (not explicitly shown in the drawings) that may be available at the longwall device 1. Thus, the oil supply system may be also configured to provide pressurized hydraulic medium, such as, for instance, HFA oil to several other components of the longwall device 1, such as the shield support 7.

As shown in FIG. 6, the hydraulic motor 161 may be in direct communication with the oil supply system via the hydraulic line 371 for providing pressurized hydraulic medium to the hydraulic motor 161.

According to the embodiment of FIG. 6, HFA oil may be supplied to the hydraulic motor 161 via the hydraulic line 371, as fire-resistant oil is required due to potential explosions.

According to this embodiment, no additionally hydraulic pump as disclosed in connection with the embodiments illustrated in FIGS. 4 and 5 is necessary, which may reduce the overall costs and may simplify the control of the hydraulic motor, as no additional hydraulic system is needed.

Although not explicitly shown in the drawings, the main driving device 14 may further include a safety brake system configured to brake the main gear unit 40 or the chain tensioning apparatus 60 during case of emergency. For example, if an emergency during a tensioning process occurs, such as a malfunction of the hydraulic motor 61, the safety brake system may be switched on for preventing, for example, any flick of the chain 6.

INDUSTRIAL APPLICABILITY

In the following, a tensioning process of the chain 6 of the face conveyor 4 via the chain tensioning apparatus 60 is described with reference to FIGS. 1 to 6.

After having installed the longwall device 1 including installing the shield supports 7, the face conveyor 4, the driving device 14, and the auxiliary driving device 16 in the longwall, the chain 6 may be installed in the upper and lower runs of the face conveyor 4. For bringing the ends of the chain 6 together such that the ends of the chain 6 may be connected to each other, one end of the chain 6 may be retained by a locking device (not shown) such that the at least one sprocket 50 may be driven for bringing the ends of the chain 6 together.

During normal operation of the driving device 14, the chain tensioning apparatus 60 is disengaged from the drive shaft 24, such that the drive shaft pinion 26 can freely rotate.

For performing the chain tensioning process, the main driving unit 30 is switched off such that the main driving unit 30 is in a non-operative state. Then, the chain tensioning apparatus 60 engages the drive shaft 24. Particularly, the second countershaft 70 is axially displaced with respect to its longitudinal direction, such that the countershaft pinion 68 engages the drive shaft pinion 26.

Then the hydraulic motor 61 receives the pressurized medium for outputting torque for driving the worm shaft 62 and, thus, for driving the drive shaft 24. As the main gear unit 40 is mechanically coupled to the drive shaft 24, the torque is transmitted to the sprocket 50 for tensioning the chain. The hydraulic motor 61 may receive the pressurized hydraulic medium via the hydraulic pump 171 (see FIG. 4), the hydraulic pump 270 (see FIG. 5), or the oil supply system of the longwall device 1 (see FIG. 6).

When the ends of the chain 6 are brought together and fixed to one another via locks (not shown), the hydraulic motor 61 may interrupt operation and the main driving unit 30 may start operation for driving the chain 6 of the face conveyor 4, such that the extracted minerals may be transported from the longwall into the drift, particularly from the face conveyor 4 to the gate conveyor 12.

During normal operation of the plow 2 and the advancing shield supports 7, the chain 6 may be tensioned or loosened by axially displacing the sprockets 50, 51. A displacing device for axially displacing the sprockets 50, 51 in order to tension or loose the chain 6 is not explicitly shown in the drawings, but may be an additional device to the chain tensioning apparatus 60. Thus, the chain tensioning apparatus 60 may be configured to tension the chain 6 during the installation process of the longwall device 1.

However, in case that an axial displacement of the sprockets 50, 51 may not be sufficient to tension the chain 6, the chain tensioning apparatus 60 may be also used for having the chain 6 tightened. In such case, the main driving unit 30 is switched off and the hydraulic motor 61 provides torque for driving the sprocket 50.

Due to the self-locking property of the worm drive of the chain tensioning apparatus 60, the above-mentioned safety brake system may be dimensioned smaller or may be completely omitted.

It is further appreciated that the different shafts and gears of the drive connection 20 and the main gear unit 40 may include appropriate bearings known in the art and, therefore, a detailed description of such bearings and supports are omitted.

Although the preferred embodiments of this invention have been described herein, improvements and modifications may be incorporated without departing from the scope of the following claims.

The invention claimed is:

1. A drive connection configured to be interconnected between a main driving unit and a main gear unit of a driving device configured to drive a chain of a conveyor-of a longwall device, the drive connection comprising:
   a housing configured to be connected to the main driving unit and to the main gear unit;
   a drive shaft disposed within the housing and configured to transmit torque from the main driving unit to the main gear unit; and
   a chain tensioning apparatus disposed within the housing and including a worm drive interacting with the drive shaft, the chain tensioning apparatus being configured to drive the drive shaft for tensioning the chain of the conveyor-when the main driving unit is in a non-operative state,
      wherein the drive shaft includes a drive shaft pinion configured to engage the worm drive of the chain tensioning apparatus.

2. The drive connection of claim 1, wherein the worm drive includes a worm shaft having a worm configured to engage the drive shaft pinion of the drive shaft.

3. The drive connection of claim 2, further comprising:
   a first countershaft including:
      a worm wheel configured to engage the worm; and
      a countershaft pinion; and
   a second countershaft including a second countershaft pinion configured to engage the first countershaft pinion and the drive shaft pinion of the drive shaft.

4. The drive connection of claim 3, wherein the second countershaft pinion is axially movable to engage or disengage with the first countershaft pinion.

5. The drive connection of claim 3, wherein
   the second countershaft pinion is fixedly attached to the second countershaft, and
   the second countershaft is axially movable to engage or disengage the second countershaft pinion with the first countershaft pinion.

6. The drive connection of claim 1, further comprising a hydraulic motor disposed within the housing and configured to drive the worm drive.

7. The drive connection of claim 6, further comprising a hydraulic pump disposed within the housing and configured to provide pressurized hydraulic medium to the hydraulic motor.

8. The drive connection of claim 6, wherein the hydraulic motor is configured to receive pressurized hydraulic medium from a hydraulic pump disposed within the main gear unit.

9. The drive connection of claim 6, wherein the hydraulic motor is configured to receive pressurized hydraulic medium from an oil supply system of the longwall device.

10. A driving device for driving a sprocket engaging a chain of a conveyor of a longwall device, comprising:
    a main driving unit configured to generate torque for driving the sprocket;
    a main gear unit connected to the sprocket and configured to receive the torque generated by the main driving unit and to transmit the torque to the sprocket; and
    a drive connection interconnected between the main driving unit and the main gear unit, the drive connection including:
       a housing configured to be connected to the main driving unit and to the main gear unit;
       a drive shaft disposed within the housing and configured to transmit the torque from the main driving unit to the main gear unit; and
       a chain tensioning apparatus disposed within the housing and including a worm drive interacting with the drive shaft, the chain tensioning apparatus being configured to drive the drive shaft for tensioning the chain of the conveyor when the main driving unit is in a non-operative state,
          wherein the drive shaft includes a drive shaft pinion configured to engage the worm drive of the chain tensioning apparatus.

11. The driving device of claim 10, wherein the drive shaft of the drive connection is configured to transmit the torque from at least one of the main driving unit and a hydraulic motor of the chain tensioning apparatus to the sprocket via the main gear unit.

12. The driving device of claim 10, wherein the worm drive includes a worm shaft having a worm configured to engage the drive shaft pinion of the drive shaft.

13. The driving device of claim 12, further comprising:
    a first countershaft including:
       a worm wheel configured to engage the worm; and
       a first countershaft pinion; and
    a second countershaft including a second countershaft pinion configured to engage the first countershaft pinion and the drive shaft pinion of the drive shaft.

14. The driving device of claim 13, wherein
    the second countershaft pinion is fixedly attached to the second countershaft, and
    the second countershaft is axially movable to engage or disengage the second countershaft pinion with the first countershaft pinion.

15. The driving device of claim 10, further comprising a hydraulic motor disposed within the housing and configured to drive the worm drive.

16. The driving device of claim 15, further comprising a hydraulic pump disposed within the housing and configured to provide pressurized hydraulic medium to the hydraulic motor.

17. The driving device of claim 15, wherein the hydraulic motor is configured to receive pressurized hydraulic medium from a hydraulic pump disposed within the main gear unit.

18. The driving device of claim 15, wherein the hydraulic motor is configured to receive pressurized hydraulic medium from an oil supply system of the longwall device.

* * * * *

UNITED STATES PATENT AND TRADEMARK OFFICE
CERTIFICATE OF CORRECTION

PATENT NO. : 9,499,347 B2  Page 1 of 1
APPLICATION NO. : 14/890250
DATED : November 22, 2016
INVENTOR(S) : Gacka et al.

It is certified that error appears in the above-identified patent and that said Letters Patent is hereby corrected as shown below:

On the Title Page

Page 2, Column 1, Item (72) (Inventors), Line 3, delete "Bergkarmen (DE);" and insert -- Bergkamen (DE); --.

Signed and Sealed this
Eighteenth Day of April, 2017

Michelle K. Lee
*Director of the United States Patent and Trademark Office*